(No Model.)
J. K. BYWATERS.
CAR COUPLING.
No. 301,798. Patented July 8, 1884.
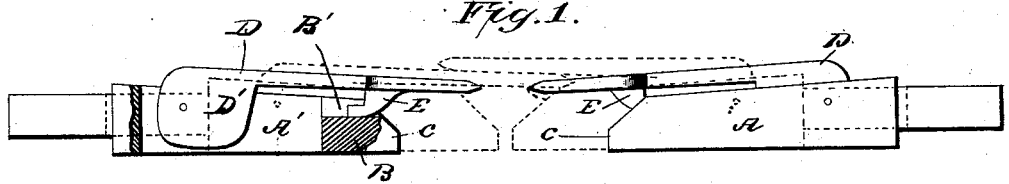
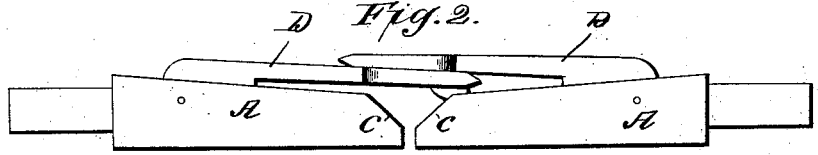
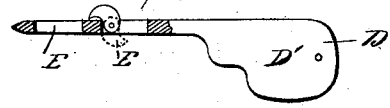
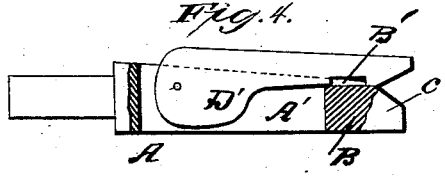
Witnesses
N. A. Clark.
E. F. Murdock
Inventor
Joseph K Bywaters
by H. A. Snow
atty.

UNITED STATES PATENT OFFICE.

JOSEPH K. BYWATERS, OF PARIS, TEXAS.

CAR-COUPLING.

SPECIFICATION forming part of Letters Patent No. 301,798, dated July 8, 1884.

Application filed March 5, 1884. (No model.)

*To all whom it may concern:*

Be it known that I, J. K. BYWATERS, of Paris, county of Lamar, and State of Texas, have invented a new and useful Improvement in Car-Couplers; and I do hereby declare that the following is a full, clear, and exact description of the invention, which will enable others skilled in the art to which it appertains to make and use it, reference being had to the accompanying drawings, forming a part thereof.

My invention relates to improvements in car-couplings; and it consists in the construction, combination, and arrangement of the several parts, as will be hereinafter fully described and claimed.

In the drawings, Figure 1 is a side view, part in section, of two draw-bars in the act of coupling. Fig. 2 shows two draw-bars coupled. Fig. 3 is a longitudinal section of the coupling-bar provided with the pivoted form of hook; and Fig. 4 shows a modification, all of which will be described.

The draw-heads A A are composed of side bars, A', which are connected at their outer ends by a cross-bar, B, the upper edge of which is below the top of bars A', forming the slot B', in which the hook rests, as presently described. The outer end, C, of the draw-head is beveled or inclined downward and forward from its upper to its lower side, in order to properly elevate the coupling bars or links, as will be presently described. The coupling-bar D is pivoted at its rear end between the bars A', and its opposite end extends forward beyond the end of the draw-head, and is preferably beveled on its upper and lower sides. The portion D' of this hook immediately in advance of the pivot is enlarged, as shown, so as to give the bar sufficient forward weight to insure a prompt dropping action at its outer or forward end, and yet so as not to make said forward end so heavy as to prevent its easy elevation in the operation of the invention. A hook, E, is secured on and depends from the lower side of the coupling-bar, in position to rest in slot B'. Through the bar in advance of this hook I form an opening, E', for the purpose presently described. The front side of the hook E is beveled inwardly from its upper end. While the hook may be made integral with the coupling-bar, as shown in Fig. 1, it will be understood that when so desired it could be pivoted to the bar, as shown in Fig. 3. This is desirable, for the reason that it reduces the height to which the coupling-bar needs to be elevated, and is easy and simple of operation. In operation, it will be seen, the coupling-bar of one car will pass under that of the other car, and will be elevated by the beveled outer end, C, of the draw-head till it strikes the hook E, when the said hook will be elevated and the lower bar pass under it till the opening E' passes under hook E, when the latter will drop into said opening and the cars be securely coupled.

The above operation relates to the construction before described, when the coupling-bar is made with an opening, E', for hook E, and such coupling-bars are on all the cars to be coupled. When some of the cars have the common links, they may be slipped under the hook E and caught thereby, as will be seen. In this case the opening E' is not needed, and for such purpose the bar may, when so desired, be made without it, as shown in Fig. 4.

I claim—

The car-coupling, substantially as herein described, composed of the draw-heads having bars A' A' and forward cross-bar, B, and beveled on its outer end, and provided with slot B' above bar B, the coupling-bar pivoted at its rear end between bars A', and enlarged at D', immediately in advance of said pivot, and provided near its outer end with an opening, E', and the hook E, pivoted to and depending from the coupling-bar, substantially as set forth.

In testimony that I claim the foregoing I append my signature.

JOSEPH K. BYWATERS.

Witnesses:
H. C. RISING,
W. L. BURDETT.